(12) United States Patent
Brodkin et al.

(10) Patent No.: US 9,158,131 B2
(45) Date of Patent: Oct. 13, 2015

(54) ACCESSORY FOR EYEGLASSES

(71) Applicant: Brodco Concepts, Inc., Sherborn, MA (US)

(72) Inventors: Paul Laurence Brodkin, Sherborn, MA (US); Craiger Jacob Scheuer, Sarasota, FL (US)

(73) Assignee: Brodco Concepts, Inc., Sherborn, MA (US)

( * ) Notice: Subject to any disclaimer, the term of this patent is extended or adjusted under 35 U.S.C. 154(b) by 0 days.

(21) Appl. No.: 14/259,685

(22) Filed: Apr. 23, 2014

(65) Prior Publication Data

US 2014/0320796 A1    Oct. 30, 2014

Related U.S. Application Data

(60) Provisional application No. 61/816,308, filed on Apr. 26, 2013.

(51) Int. Cl.
   *G02C 11/02*    (2006.01)

(52) U.S. Cl.
   CPC .................................. *G02C 11/02* (2013.01)

(58) Field of Classification Search
   CPC ................................ G02C 11/00; G02C 11/02
   USPC ........................................................ 351/51, 52
   See application file for complete search history.

(56) References Cited

U.S. PATENT DOCUMENTS 5,654,787 A * 8/1997 Barison ........................ 351/52
7,229,172 B2 * 6/2007 Presswood et al. .......... 351/155

* cited by examiner

*Primary Examiner* — Huy K Mai
(74) *Attorney, Agent, or Firm* — Shumaker, Loop & Kendrick, LLP

(57) ABSTRACT

Disclosed is an accessory for eyeglasses. This accessory for eyeglasses may be used for numerous purposes including, but not limited to, prominently displaying branding indicia, advertising indicia, or any combination thereof. In certain aspects, the accessory for eyeglasses may include a clip configured to secure around an earpiece of a pair of eyeglasses. In certain aspects, the clip includes spaced first and second members connected through a U-shaped bend such that the second member is biased in the direction of the first member. The first member includes an attachment feature protruding from one side thereof in a direction away from the second member, and the second member is divided into a central member centered between spaced side members. The accessory for eyeglasses further includes a button configured to be removably attached to the attachment feature.

15 Claims, 4 Drawing Sheets

ACCESSORY FOR EYEGLASSES

CROSS REFERENCE TO RELATED APPLICATION

This application claims the benefit of U.S. Provisional Application No. 61/816,308, filed on Apr. 26, 2013, which is incorporated by reference in its entirety.

TECHNICAL FIELD AND BACKGROUND OF THE INVENTION

The present invention relates generally to decorations and ornaments for eyeglasses, and more particularly, to an accessory displaying indicia thereon configured to removably attach to the earpiece of eyeglasses.

Businesses are continuously looking for new ways and real estate to advertise, while consumers are continuously looking for new ways to accessorize. When these interests can be satisfied by the same product, both parties obtain a benefit.

Decorations and ornaments are well known for accessorizing clothing, hats, shoes and other articles. Glasses and sunglasses, referred to generically herein as "eyeglasses," are one such article yet to be exploited for accessorizing. While prescription eyeglasses come in many different styles, such styles are typically relatively generic so that eyeglasses can be worn on a daily basis without starkly contrasting with the wearer's outfit and other accessories. Sunglasses, which are typically worn only as needed, may be more decorative, but are usually still fairly generic so as not to clash with an outfit and other accessories.

There are times when a person wishes to highly accessorize their outfit, for example, at a sporting event, political rally, concert, etc. During such times, it would be desirable to offer an additional way to accessorize. It would further be desirable to utilize an article already being worn as the supporting surface for an additional temporary and interchangeable accessory. It would further be desirable to provide an accessory that attaches to an article without damage or modification to the article, and an accessory with a universal means of attachment and a display portion that can be highly customized.

SUMMARY OF THE INVENTION

Disclosed is an accessory for eyeglasses. This accessory for eyeglasses may be used for numerous purposes including, but not limited to, prominently displaying branding indicia, advertising indicia, or any combination thereof. In certain aspects, the accessory for eyeglasses may include a clip configured to secure around an earpiece of a pair of eyeglasses. In certain aspects, the clip includes spaced first and second members connected through a U-shaped bend such that the second member is biased in the direction of the first member. The first member includes an attachment feature protruding from one side thereof in a direction away from the second member, and the second member is divided into a central member centered between spaced side members. The accessory for eyeglasses further includes a button configured to be removably attached to the attachment feature.

In certain aspects, the central member is spaced closer to the first member than either one of the side members.

In certain aspects, the side members are connected to the first member through first U-shaped bends, and the central member is connected to the first member through a second U-shaped bend. In certain aspects, the second U-shaped bend has a greater degree of curvature than the first U-shaped bends.

In certain aspects, the attachment feature defines a slot, and the button includes a backing defining a protrusion configured to be slidably received in the slot.

In certain aspects, the button includes an ornamental face removably attached to a backing configured to engage within the attachment feature.

In certain aspects, the button has a protrusion on a backside thereof that engages beneath a pair of lips on the attachment feature to prevent the button from being pulled apart from the clip in a direction transverse to the plane of the first member.

In certain aspects, the spaced side members are parallel relative to one another.

In certain aspects, the central member is parallel relative to the spaced side members.

In certain aspects, the clip is integrally formed.

Also disclosed is an accessory for eyeglasses, including a clip configured to secure around an earpiece of a pair of eyeglasses. The clip having spaced first and second members connected through an arcuate bend such that the second member is biased in the direction of the first member, and the first member having an attachment feature protruding from one side thereof in a direction away from the second member. In certain aspects, the second member being divided into a central member centered between spaced side members. The accessory for eyeglasses further includes an ornamental button having a protrusion configured to slidably engage the attachment feature such that the ornamental button can be removably attached to the attachment feature.

In certain aspects, the second member has an end portion directly contacting a portion of the spaced side members and the central member.

In certain aspects, the central member is spaced closer to the first member than either one of the side members, and wherein the spaced side members are parallel relative to one another.

In certain aspects, the side members are connected to the first member through a U-shaped bend, and the central member is connected to the first member through a second U-shaped bend. In certain aspects, the second U-shaped bend has a greater degree of curvature than the first U-shaped bends.

In certain aspects, the second U-shaped bend having a greater degree of curvature than the first U-shaped bends forms an acute angle ranging from 2° to 30° when the accessory is not attached to the earpiece of a pair of eyeglasses.

In certain aspects, the attachment feature defines a slot comprising a pair of lips, and the button includes a backing defining a protrusion configured to be slidably received and engaged beneath the pair of lips on the attachment feature to prevent the button from being pulled apart from the clip in a direction transverse to the plane of the first member.

In certain aspects, the clip is integrally formed.

BRIEF DESCRIPTION OF THE DRAWINGS

Features, aspects, and advantages of the present invention are better understood when the following detailed description of the invention is read with reference to the accompanying drawings, in which.

DETAILED DESCRIPTION OF THE INVENTION

Figure 1:
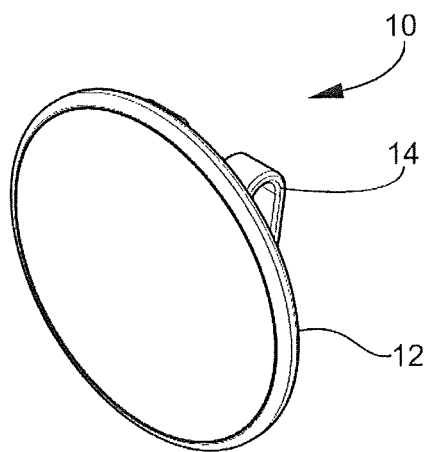
FIG. 1 is an isometric view of an eyeglass accessory according to an embodiment of the invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, an embodiment of an eyeglass accessory is shown generally herein at reference numeral 10. The eyeglass accessory, referred to herein as the "accessory," generally includes a display portion 12 and an attachment portion 14. The display portion 12 may take the form of a button 16 in a preferred embodiment of the invention, and can be customized to display any indicia thereon. Indicia may include, but is not limited to, graphics, text, colors, decorations, lighting, etc. In a particular embodiment, the indicia may include a sports team logo. This accessory for eyeglasses may be used for numerous purposes including, but not limited to, prominently displaying branding indicia, advertising indicia, or any combination thereof.

Although the term "button" is used herein to denote the round or disk shape shown in the figures, it should be understood that the button can have any size or shape without dimensional limitations. In particular embodiments, the button may take the shape of the image being displayed or may have a basic geometrical shape. Any form of indicia may be included on the button, which may be displayed when the eyeglass accessory is attached to an earpiece of an eyeglass. For example, these indicia may include, but are not limited to, a team name, a team emblem, a slogan, an image, etc.

Figure 4:
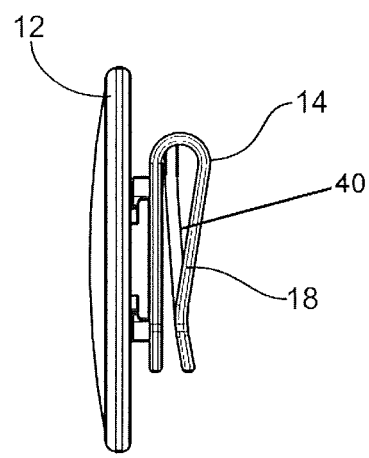
FIG. 4 is a side elevation view of the accessory shown in FIG. 1.
Figure 5:
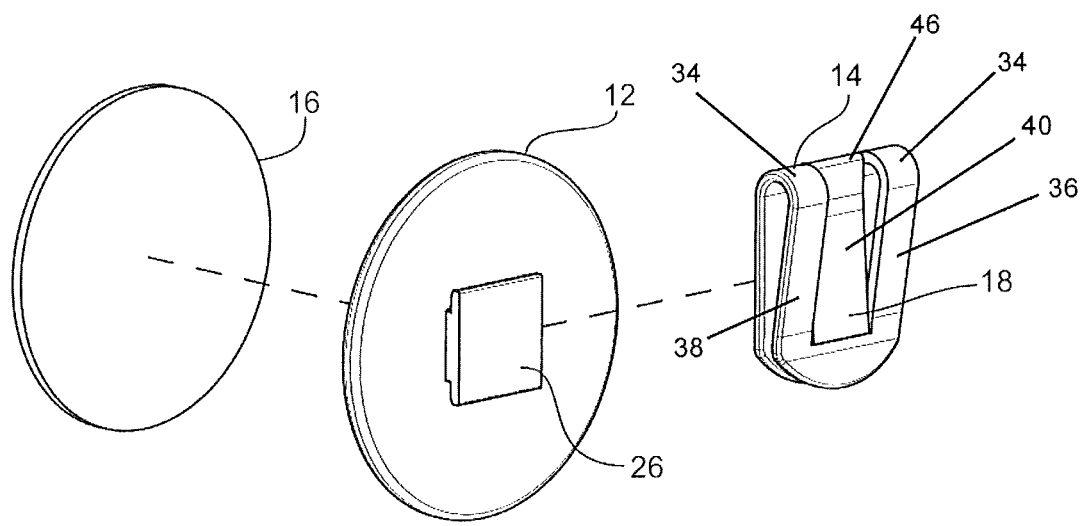
FIG. 5 is an exploded perspective view of the accessory shown in FIG. 1.

The display portion 12 has a front face for displaying the indicia and a rear face configured to attach to the attachment portion 14. As shown in FIGS. 1-4, the display portion 12 may have a convex front face and planar rear face. Referring to FIG. 5, the display portion 12 may be unitary construction or may include a removable face to provide a universal backing and interchangeable face customization.

The attachment portion 14 as shown in the figures takes the form of a clip 18, although other attachment mechanisms are envisioned. The clip 18 as shown is advantageously configured to be removably attached to the earpiece of eyeglasses without damage or modification thereto. The clip 18 may be made of a unitary construction or the clip may include several components attached to one another by fasteners or adhesives to form the clip. The clip is preferably made from a sturdy and resilient material, which may include a polymeric material, metal, metal alloy, or any combination thereof. The polymeric material may include at least one of polyolefin, polyester, or any combination thereof. For example, the polymeric material may include polypropylene and derivatives thereof, polyethylene and derivatives thereof, polybutene and derivatives thereof, polypentene and derivatives thereof, poly-vinyl chloride and derivatives thereof, nylon and derivatives thereof, synthetic rubbers and derivatives thereof, and any combination thereof. In certain aspects, the clip 18 includes a unitary construction and is preferably made from a moldable and extrudable thermoplastic resin that includes any of the polymeric materials listed immediately above. In certain aspects, the clip 18 as shown is plastic molded to generally form a U-shaped spring with opposing leaves 20, 22 (i.e., spaced first and second members respectively), the inner leaf 20 (spaced first member) being adapted for attachment to the display portion 12, and the outer leaf (spaced second member) being adapted to capture the earpiece of the eyeglasses. The spring produces a spring tension between the inner and outer leaves 20, 22. When the clip 18 is placed over/around the earpiece, the earpiece is received between the inner and outer leaves 20, 22.

The clip 18 preferably includes opposing leaves 20, 22, in which one leaf (e.g., spaced first member 20) is defined as a flat, planar portion. In certain aspects, the spaced first and second members are connected through a U-shaped bend 34 (and/or an arcuate bend) such that the second member 22 (outer leaf) is biased in the direction of the first member 20 (inner leaf). In certain aspects, the two opposing leaves 20, 22 are connected to one another by an arcuate loop 34 such that portions of the outer leaf 22 are positioned diagonally relative to leaf 20. In certain aspects, two end portions 30, 32 of the respective leaves 20, 22 are positioned to form an acute angle. For example, the acute angle may range from 2° to 30°, 2° to 20°, 2° to 15°, 4° to 25°, 4° to 18°, 4° to 10°, 6° to 15°, 6° to 10° when the clip is not attached to an eyeglass. In certain aspects, two end portions 30, 32 of the respective leaves 20, 22 demonstrate elastic resiliency to have an angle ranging 5° to 90°, 5° to 40°, 5° to 30°, 10° to 70°, 10° to 60°, 20° to 70°, 20° to 50°, 30° to 60° when the clip is attached to an eyeglass. In certain aspects, the arcuate loop 34 has a circular or semicircular shape with a radius that is either equal to or larger than the spacing between the two end portions 30, 32 of the opposing leaves. In certain aspects, one end portion 32 of the opposing leaves 20, 22 flares out and away relative to the other end portion of the respective opposing leaf.

Figure 8:
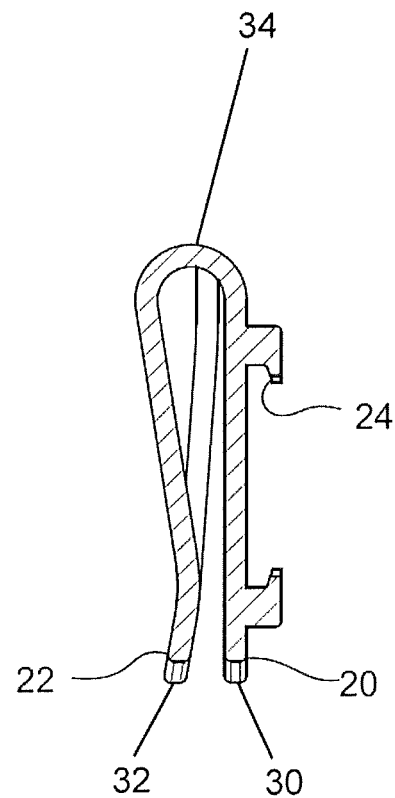
FIG. 8 is a sectional view of the clip shown in FIG. 7 taken along line C-C.
Figure 9:
FIG. 9 is a top plan view of the button of the accessory shown in FIG. 1.
Figure 10:
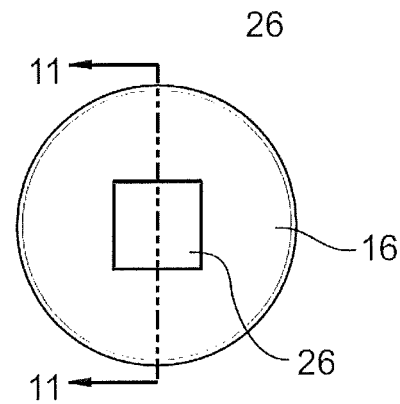
FIG. 10 is a rear elevation view of the button.
Figure 11:
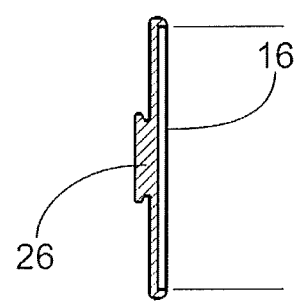
FIG. 11 is a side elevation view of the button.

In certain aspects, the second member (outer leaf) 22 is divided into a central member 40 centered between spaced side members 36, 38. In certain aspects, the side members 36, 38 are connected to the first member (inner leaf) 20 through first U-shaped bends 34, the central member is connected to the first member through a second U-shaped bend 46, and the second U-shaped bend 46 has a greater degree of curvature than the first U-shaped bends 34. As depicted in FIGS. 5 and 8, central member 40 may include a planar portion that extends diagonally towards an end portion of leaf 20 such that the end portion of leaf 20 and the central member 40 of leaf 22 are directly connected to one another by the second U-shaped bend 46, preferably forming an acute angle ranging from 2° to 10°, 2° to 8°, 2° to 6°, 3° to 9°, 3° to 7°, 4° to 7°, 4° to 5° when the clip is not attached to an eyeglass. In certain aspects, the end portion of leaf 20 and the central member 40 of leaf 22 (being directly connected to one another) are configured to exhibit elastic resiliency at angles ranging from 3° to 90°, 3° to 40°, 3° to 30°, 5° to 20°, 5° to 15°, 7° to 15°, 7° to 10°, when the clip is attached to an eyeglass. In certain aspects, the arrangement leaf arrangement depicted in FIGS. 5 and 8 is particularly advantageous because the clip 18 includes at least two portions of the clip that can impinge and secure attachment to an eyeglass. Furthermore, the clip 18 depicted in FIGS. 5 and 8 allows for improved engagement and overall advantageously increases durability of the disclosed clip 18 when compare to clips not having, for example, a central member 40 and side members 36, 38 as discussed immediately above.

Figure 12:
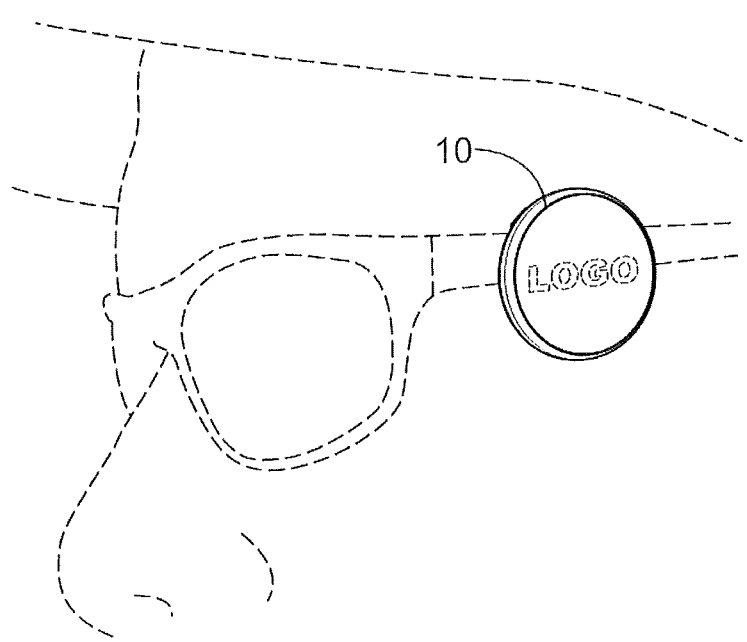
FIG. 12 depicts the accessory attached to a pair of eyeglasses.

Before being attached to the earpiece, the spring tension between the leaves (spaced first and second members) 20, 22 is substantially zero. When attached, as shown in FIG. 12, the spring tension is greater than zero, and dependent on the width and/or height dimensions of the earpiece. The greater the spring tension after application, the greater the holding force and resistance to the accessory 10 moving along the length of the earpiece or separating therefrom. The clip 18 as shown includes an aperture, which is optional. The outer leaf 22 is preferably at an angle to the inner leaf 20 such that the earpiece is substantially surrounded by the clip and resists relative vertical movement. In certain aspects, the central member 40 of leaf 22 is configured to further contact the earpiece to further secure the clip 18 to the earpiece.

Figure 2:
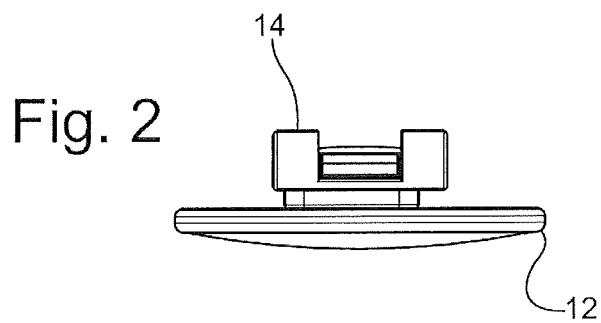
FIG. 2 is a top plan view of the accessory shown in FIG. 1.
Figure 3:
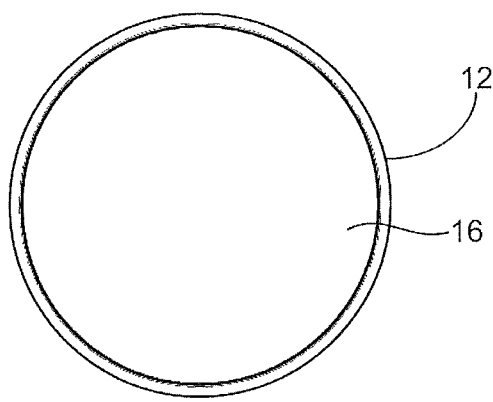
FIG. 3 is a front elevation view of the accessory shown in FIG. 1.
Figure 6:
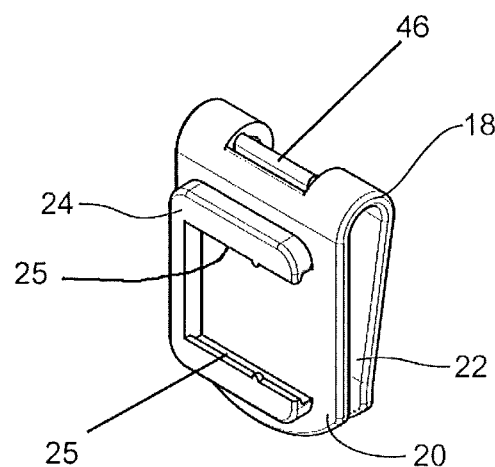
FIG. 6 is an isometric view of an embodiment of a clip.
Figure 7:
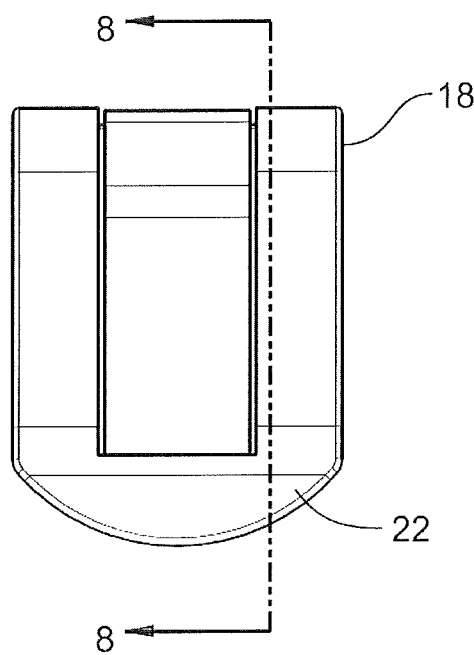
FIG. 7 is a front elevation view of the clip shown in FIG. 6.

The inner leaf 20 includes an attachment feature 24 for receiving a portion of the button and potentially locking the button in place. In certain aspects, attachment feature 24 protrudes from a side of the first member 20 in a direction away from the second member 22. In certain aspects, attachment feature 24 includes a pair of lips 25 configured to engage a portion 26 of the display portion 12. When portion 26 engages the pair of lips 25, the button is prevented from being pulled apart from the clip in a direction transverse to the plane of the first member. In certain aspects, this attachment feature 24 includes a C-shaped female part disposed on the face of the inner leaf 20 opposite the outer leaf 22. The C-shaped female part 24, which may have alternative shapes, is adapted to receive a feature 26 on the backside of the display portion 12 to removably attach the display portion 12 to the attachment portion 14. As shown in FIGS. 2, 4, and 6, feature 26 is a protrusion on the backside of the button 16 that slidingly engages with tracks 25 within the female part 24. In certain aspects, this sliding engagement includes a locking mechanism to maintain a stationary positioning of the button. In certain aspects and as depicted in FIGS. 5 and 6, feature 26 may include either a square or rectangular shape that is configured to engage the tracks 25 of the C-shaped female part 24. In certain aspects, this locking mechanism may include, for example, a snap-locking mechanism. In certain aspects, the display portion 12 may be configured to separate from the attachment portion 14 thus allowing the display portion 12 to be interchanged and/or clip 18 to be replaced if broken. In an alternative embodiment, the female part 24 and the feature 26 may be eliminated and the display portion 12 may be permanently attached to the attachment portion 14.

The dimensions shown in the figures are not intended to limit the present invention, but are provided by way of example only. The dimensions show one accessory size adapted to engage the majority of earpiece sizes and be worn without causing discomfort to the wearer. In other words, the accessory should be sized such that the display portion 12 and attachment portion 14 minimally touch the head, if at all. The display portion 12 should further be sized such that it does not block the peripheral vision of the wearer. The accessory 10 is adapted to attach at any point along the length of the earpiece, and preferably forward of the ear.

In alternative embodiments, the accessory may include exposed magnets, embedded magnets and/or pressure-sensitive adhesives, etc. for attaching components and/or helping to maintain the accessory on the earpiece. The accessory is not limited for use only with the earpiece of eyeglasses, and is adapted to attach to other articles including, but not limited to, belts, pockets, hats, etc.

The foregoing description provides embodiments of the invention by way of example only. It is envisioned that other embodiments may perform similar functions and/or achieve similar results. Any and all such equivalent embodiments and examples are within the scope of the present invention.

What is claimed is:

1. An accessory for eyeglasses, comprising:
   a clip configured to secure around an earpiece of a pair of eyeglasses, the clip having spaced first and second members connected through a U-shaped bend such that the second member is biased in the direction of the first member, the first member having an attachment feature protruding from one side thereof in a direction away from the second member, and the second member being divided into a central member centered between spaced side members; and
   a button configured to be removably attached to the attachment feature.

2. The accessory of claim 1, wherein the central member is spaced closer to the first member than either one of the side members.

3. The accessory of claim 1, wherein the side members are connected to the first member through first U-shaped bends, the central member is connected to the first member through a second U-shaped bend, and the second U-shaped bend has a greater degree of curvature than the first U-shaped bends.

4. The accessory of claim 1, wherein the attachment feature defines a slot, and the button includes a backing defining a protrusion configured to be slidably received in the slot.

5. The accessory of claim 1, wherein the button comprises an ornamental face removably attached to a backing configured to engage within the attachment feature.

6. The accessory of claim 1, wherein the button has a protrusion on a backside thereof that engages beneath a pair of lips on the attachment feature to prevent the button from being pulled apart from the clip in a direction transverse to the plane of the first member.

7. The accessory of claim 1, wherein the spaced side members are parallel relative to one another.

8. The accessory of claim 7, wherein the central member is parallel relative to the spaced side members.

9. The accessory of claim 1, wherein the clip is integrally formed.

10. An accessory for eyeglasses, comprising:
    a clip configured to secure around an earpiece of a pair of eyeglasses, the clip having spaced first and second members connected through an arcuate bend such that the second member is biased in the direction of the first member, the first member having an attachment feature protruding from one side thereof in a direction away from the second member, and the second member being divided into a central member centered between spaced side members; and
    an ornamental button having a protrusion configured to slidably engage the attachment feature such that the ornamental button is configured to be removably attached to the attachment feature, wherein:
    the second member has an end portion directly contacting a portion of the spaced side members and the central member.

11. The accessory of claim 10, wherein the central member is spaced closer to the first member than either one of the side members, and wherein the spaced side members are parallel relative to one another.

12. The accessory of claim 10, wherein the side members are connected to the first member through a U-shaped bend, the central member is connected to the first member through a second U-shaped bend, and the second U-shaped bend has a greater degree of curvature than the first U-shaped bends.

13. The accessory of claim 12, wherein the second U-shaped bend having a greater degree of curvature than the first U-shaped bends forms an acute angle ranging from 2° to 30° when the accessory is not attached to the earpiece of a pair of eyeglasses.

14. The accessory of claim 10, wherein the attachment feature defines a slot comprising a pair of lips, and the button includes a backing defining a protrusion configured to be slidably received and engaged beneath the pair of lips on the attachment feature to prevent the button from being pulled apart from the clip in a direction transverse to the plane of the first member.

15. The accessory of claim 10, wherein the clip is integrally formed.

\* \* \* \* \*